United States Patent [19]
Colestock et al.

[11] 3,799,682
[45] Mar. 26, 1974

[54] APPARATUS FOR FEEDING POLISHED MACHINE PARTS PAST OPTICAL SCANNING MEANS TO ENABLE INSPECTION OF THE POLISHED PARTS

[75] Inventors: Harry Elliott Colestock, Ann Arbor; Kenneth G. Hoadley, Westland; Eugene J. Marcinkiewicz, Plymouth, all of Mich.

[73] Assignee: International Telephone and Telegraph Corporation, New York, N.Y. ; by said Harry Elliott Colestock and Kenneth G. Hoadley

[22] Filed: June 16, 1972

[21] Appl. No.: 263,697

[52] U.S. Cl. ........ 356/237, 209/111.7, 250/219 DF, 250/224, 356/200
[51] Int. Cl. ...................... G01n 21/16, G01n 21/32
[58] Field of Search ...... 356/200, 237; 250/219 DF, 250/224; 350/6; 209/111.7

[56] References Cited
UNITED STATES PATENTS

| | | | |
|---|---|---|---|
| 2,719,235 | 9/1955 | Emerson | 356/200 |
| 3,515,488 | 6/1970 | Houser | 356/200 |
| 3,360,651 | 12/1967 | Linderman | 356/200 |
| 3,061,731 | 10/1962 | Thier et al. | 356/200 |
| 3,125,265 | 3/1964 | Warren et al. | 356/200 |
| 3,016,464 | 1/1962 | Bailey | 350/6 |
| 3,234,844 | 2/1966 | Fain et al. | 350/6 |

*Primary Examiner*—Ronald L. Wibert
*Assistant Examiner*—V. P. McGraw
*Attorney, Agent, or Firm*—James B. Raden

[57] ABSTRACT

A machine is disclosed which automatically orients, feeds, tests and sorts polished machine parts. Testing involves optical scanning and sensing. Optical scanning is accomplished by use of a laser beam, lenses and a rotating prism to produce a linear flying spot scan. The flying spot scan is directed over a surface under test, producing a reflected beam. The reflected beam is sensed by photo-electric means which produces test result signals indicating the presence and absence of flaws. A second light source is used, in conjunction with reflecting coatings on the rotating prism, a second photo-electric device and logic circuit to provide gating signals indicating the length of the test area. The gating signals and test result signals are supplied to a gate which excludes test result signals outside the test area. Memory means records the results of testing each machine part and provides signals to control the sorting of parts and the recording of results.

15 Claims, 8 Drawing Figures

APPARATUS FOR FEEDING POLISHED MACHINE PARTS PAST OPTICAL SCANNING MEANS TO ENABLE INSPECTION OF THE POLISHED PARTS

BACKGROUND OF THE INVENTION

1. Field of the Invention

The present invention relates to automatic machinery for inspecting polished parts for flaws and separating-out flawed parts. It relates more particularly to automatic machinery for feeding finished parts into optical scanning equipment, determining which parts pass certain standards of quality relating to discontinuities in either surface contrast or volume, segregating the defective parts from the good parts and providing visual displays of the results.

2. The Prior Art

In the past, the most effective way for determining whether finished rollers have had flaws has been by direct inspection. This is a tedious and costly procedure which requires the use of a great deal of man power. The quality of results from tests involving such manual inspection has sometimes been very low due to such factors as fatigue and subjective differences of opinions as to what constitutes a "flaw." The cost in dollars of inspection by hand has been high.

Attempts have been made in the prior art to overcome the disadvantages of direct inspection by people by providing for automatic testing and sorting by machines. Known attempts have involved the use of machines which scanned rollers as they passed by at high speeds to provide a first scan at the same time the rollers revolved at high speed to provide a second scan. Handling highly finished parts revolving at high speeds in this manner is not conducive to maintenance of their highly finished state. It was common in the prior art to use beam deflection provided by an oscillating mirror, or shutter. Oscillating devices are subject to great wear and tend to be less reliable than rotating devices. Also, it is difficult to get a good linear scan in an object plane by this means.

SUMMARY OF THE INVENTION

In view of the foregoing, it is an object of the present invention to provide a machine which can automatically inspect finished rollers for flaws of a visible nature, sort the rollers, place them in separate bins of "good" and "flawed" rollers and provide a count of the respective number of good and flawed rollers which have been inspected during a given period.

It is a further object to provide for automatic flaw detection and sorting of rollers which are turned at lower speeds than heretofore and thus to minimize the possibility of damage to the parts being tested and sorted.

Other objects include the realization of greater resolution in testing them heretofore, thereby enabling more accurate tests and tests for smaller flaws. A collateral object is to produce signals from an optical scan which are more consistent than heretofore, thereby providing more usable signals for electronic processing.

Still other objects are to reduce the size of the scanner and provide a more direct optical path. These objects are attained by use of a rotating prism in place of an oscillating mirror or a shutter. The use of a rotating prism is believed also to provide a flatter field than is possible with a single mirror, since the prism sweeps its object plane parallel to the part plane.

Still another object has been to provide an improved end gating system which will detect the ends of the object being tested and prevent false readings. This has been attained largely through use of an auxiliary light source and mirrors on the rotating prism to produce gating pulses in perfect synchronization with the test scan.

A further object has been to overcome limitations in the speed of testing caused by bouncing of parts under test. Increased testing speed is attained in the practice of the present invention by improvements in feeding techniques which enable vibration of the part being tested to greatly decrease before the actual scan by the laser beam.

In the practice of the present invention means is employed to feed finished parts to an inspection apparatus, to automatically inspect surfaces of test objects using optical scanning and sensing techniques, to divert selected parts to bins and to provide visible read-out of results. Generally, monochromatic light, such as that available from a laser, is employed in the scanning phases. A light beam from a laser source is collimated further when light is passed through the opening in an iris diaphragm. It is the brought, by a first lens, to a sharp focus on an object plane in a rotating prism. Rotation of the prism produces a beam of laser light which moves to and fro, forming a linear sweep. The beam is directed by this action to linearly scan a second lens which transmits the beam with an increased sweep. The beam is directed then towards the object to be tested. This testing system is intended to test for surface irregularities of cylindrical objects including discontinuities in surface contrast or volume. It may be adapted to other than cylindrical objects to which a linear scan may be applied.

The object being inspected is placed with the surface to be tested tangent to the focal plane of the second lens so that the surface to be tested is scanned linearly and uniformly by a pin-point of light. The light reflected from the surface being tested is therefore from a point source. This light forms a second beam which is reflected at an angle to the first beam to energize a photo-diode which can then operate suitable sorting equipment as well as electronic detector and logic equipment.

So long as the object under test continues to reflect light from a point source, the video output of the photo-diode will be relatively constant. If the surface of the object varies either in height or in contrast, the reflection will be at a lower amplitude and the amount of light transmitted for detection by the photo-diode will be less. This will cause the photo-diode to produce a reduced output which is generally in the form of a negative going spike in the video signal.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which.

DESCRIPTION OF PREFERRED EMBODIMENTS

THE MECHANICAL PATH

The parts to be inspected are placed in a parts feeding and orienting device which is used in conjunction with the present machine. This portion of the machine involves the use of components from well known sorting machinery, such as the Non-mar hopper manufactured by ITT Industrial and Automation Systems. Accordingly, it is not fully illustrated herein.

Figure 1:
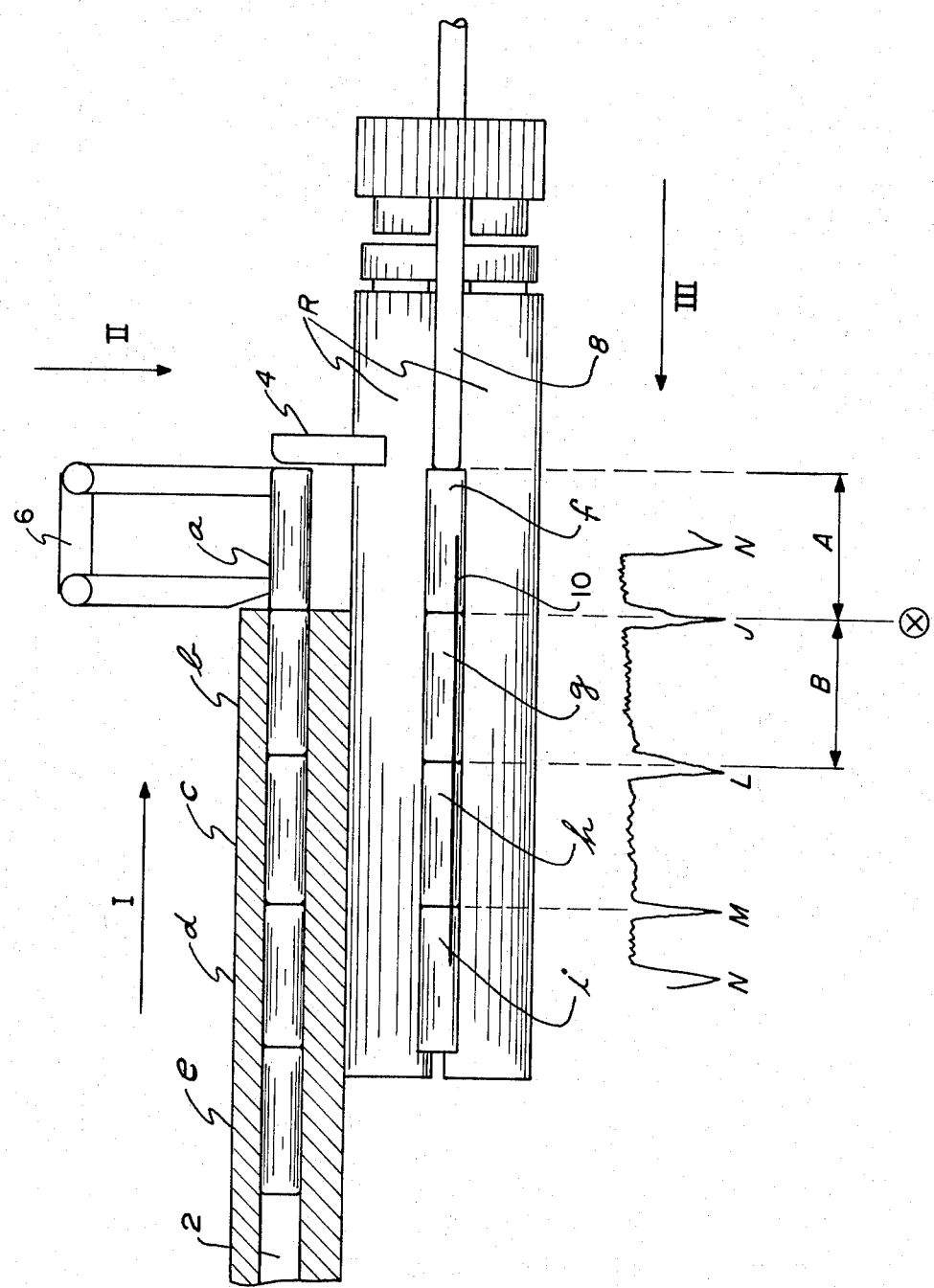
FIG. 1 is an elevation showing the arrangement of certain mechanical elements of a machine in accordance with the invention, and including also a representation of the scan pattern of a laser beam and video signals resulting from the scan.

Aligned rollers, indicated at $a$, $b$, $c$, $d$ and $e$ in FIG. 1, are fed by a belt at 2 (which is part of a Non-mar hopper) in the direction indicated by arrow I in FIG. 1 until the first one of the parts (here labeled "$a$") comes to rest against the stop 4.

Pushers indicated at 6 and 8 are programmed alternately to push parts in the directions of the arrows II and III into new positions. With rollers $a$, $b$, $c$, $d$, $e$, $f$, $g$, $h$ and $i$ in the positions shown, the pusher rod 8 will be first to operate, pushing the parts $f$, $g$, $h$ and $i$ over the faces of rollers R in the direction indicated by the arrow III. The parts are pushed a distance slightly greater than the length of a part to make room for the next part, in this example part "$a$."

With the way clear for another part on the rollers R, the pusher indicated by 6 is programmed to push the next part in the direction of the arrow II onto the rollers R. In this way the parts are advanced in an orderly fashion for inspection.

Each time the pusher 8 operates, the first part in line will be pushed off the rollers to either a bin for "good" or a bin for "defective" parts. The actual sorting is by activation of a known mechanical element (not shown) which opens the correct bin according to electrical signals. The determination of which parts go to the respective bins and the manner in which the electrical control signals are derived are explained in subsequent paragraphs. Cam operated switches are provided for operation by pushers 6 and 8 to generate signals of use in logic circuits described hereinafter.

THE OPTICAL PATH

Figures 2, 3:
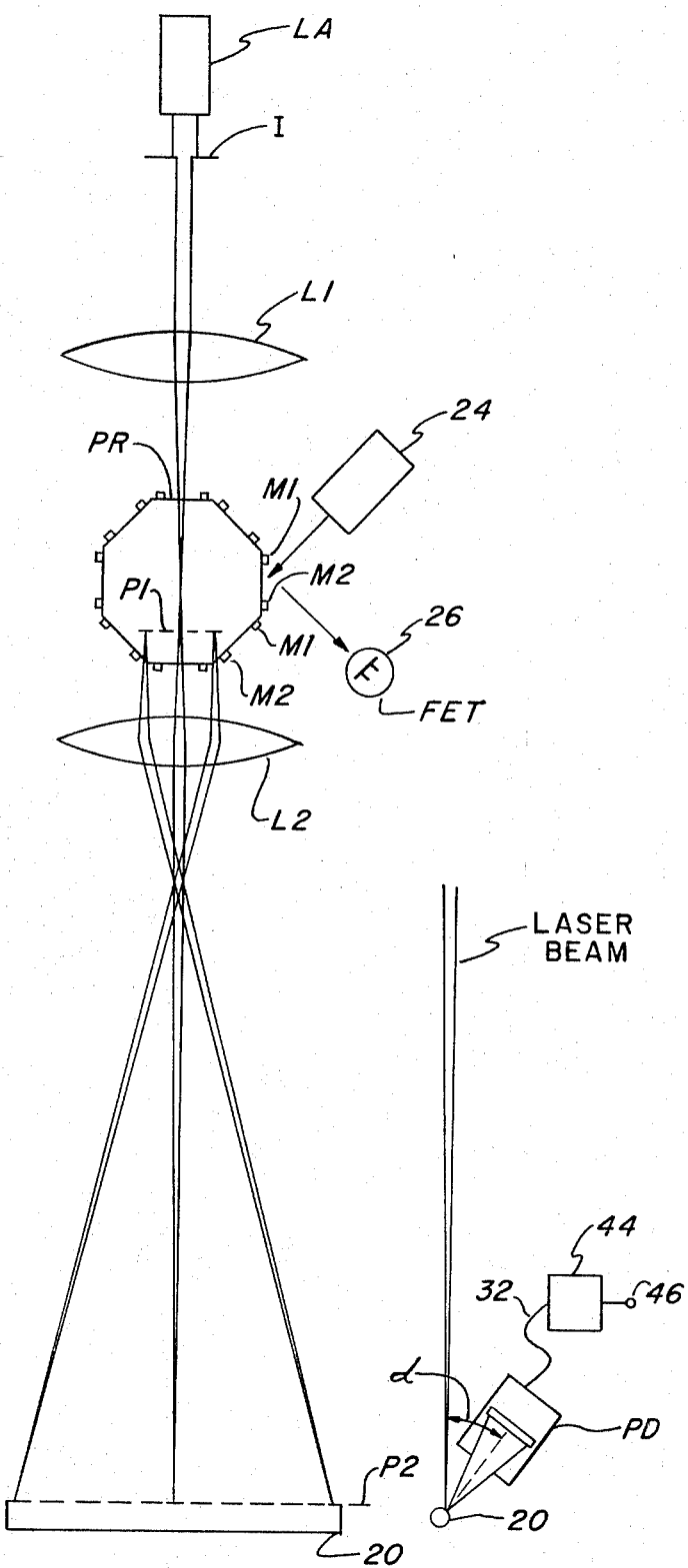
FIG. 2 is a diagram depicting various aspects of an optical system of use in the practice of the invention, FIG. 3 discloses relationships between the scanning laser beam, the object scanned and the photo sensitive device which detects the reflected light from the object.

Turn now to FIG. 2 for a description of the optical path. A collimated beam from the laser LA is directed through an iris at I and a first lens L1 at a fixed distance from the laser. The lens L1 focuses the beam to a very fine spot in an object plane indicated by the dashed line P1 near the bottom edge of the prism PR. The iris controls the size of the beam impinging on the first, or top, lens, but its main purpose is to reduce the secondary reflections which cause a halo around the spot. The top lens focuses the upper collimated beam to a very fine spot which lies in the plane P1 somewhere near the bottom edge of the prism. The distance from the top lens to the iris is not critical. The distance from the lens L1 to the prism is determined by the above mentioned need to generate the focal point near the bottom edge of the prism. The forward, backward and lateral positions of the lens L1 are adjusted so that the collimated beam falls at the center of the lens and that the cone of light below the lens is centered on the prism so that the full width of the prism face may be used as it spins.

The prism is rotated about an axis through its center perpendicular to the plane of the paper. The prism translates the spot to produce a spot, in a given example, that moves about 1/2 inch (left to right) in a given configuration as it exits from the bottom of the prism. The beams of light coming from the bottom of the prism are always vertical cones. The bottom, or second, lens L2 enlarges the 1/2 inch scan to a 3 inch scan. Obviously, since the enlargement is six to one, the spot size becomes enlarged by a ratio of six to one. Thus the object plane P1 for the bottom lens must be at a portion of the beam where it is 1/6 of 0.015 inches, since the spot on the bearing must be 0.015 inches in diameter. Notice now that the scan of the spot at the image plane P2 is from right to left.

The bottom lens has two micrometer adjustments (not shown). The adjustment to the left of the lens center line translates the scan range left-right. When the scanner is being roughly positioned left-right, it is necessary to be certain that the bottom prism face is parallel to the rollers, or bearing, and to position the spot via the left micrometer adjustment such that spot on the bearing is 1 inch to the left of the next position (X) in FIG. 1. This will assure an optimum lateral position of the scanner with respect to the bearing inspection station.

The micrometer adjustment to the rear of the lens center line positions the scanning line forward and backward. This adjustment is rather critical and must be done after rough alignment of the cell-fixture. One affects the other and each may have to be readjusted after the other is positioned. To obtain the six to one increase of scan (and spot size) the distance between the prism and the bottom lens and the distance between the bottom lens and the roller are fixed. Both dimensions are a function of the focal length of the bottom lens L2. Since the depth of focus of the system is rather large, the six to one ratio may be obtained by moving the bottom lens up or down (scanning motion) without raising or lowering the scanner and without regrading the spot sharpness too much.

Rotation of the prism PR causes a flying spot line scan to be generated in a plane P2 over a part to be inspected at 20. Light reflected off of the surface at 20 is reflected at an angle $\alpha$ to the laser beam, as indicated in FIG. 3, to impinge on a photo-diode at PD. A photo-diode is used at this point because of its very quick response to changes in the amplitude of the reflected light. Light on the photo-diode PD generates an electrical signal which is transmitted over the line 32 to a video detector 44. The video detector provides a signal at 46 which is employed to operate electronic circuits providing further signals to control centers, display devices and the sorting machinery. The electronic circuits are described further in connection with FIG. 4.

THE SCANNING PROCESS

As will be seen from the foregoing, the machine uses a flying laser spot scanner which scans the part longitudinally along a narrow line. In a typical case, this spot is 15 thousandths of an inch in diameter. The size of the spot limits the area of the parts surface from which the reflected light is measured. High reflectance is received from smooth areas, but if at a given instant, the laser spot is over a dark pit little light will be reflected onto the PD cell. When the spot moves off of this pit and onto the bright well-finished part of the surface, the light falling on the cell will again increase. These changes in light intensity reflected by the part's surface are converted into an electronic signal by the photo diode PD.

The polarities of the signal at the BNC of the amplifier are minus for dark areas and plus for the light areas. In some cases a highly polished dent will give a more positive followed by a more negative signal. This type of flaw will sometimes also be detected, depends on the sensitivity of the settings.

LONGITUDINAL SCANNING PATTERN

The system is so designed that the spot moves along the part under test starting beyond one end, moving at a relatively constant speed as it sweeps down the length of the part, and off the opposite end. In an exemplary application, this process is repeated 480 times per second. The part is rotated by the roller R while this scanning process takes place so that the entire outside diameter surface will be covered by the longitudinal scan lines. This rotational motion is quite slow, on the order of two revolutions per second, and is one of the features of this invention, as it is gentle on the highly finished surfaces of the parts under inspection.

When the spot moves across a flaw such as a small dark pit, the abrupt change in light is converted into a correspondingly abrupt change in the electrical signal. Small flaws such as pits and nicks tend to produce abrupt changes in signal strength because the spot moves on and off the flaw in a very short time. When the window moves across a larger flaw, such as a check mark or a dull spot, the signal produced is quite different from that produced by a pit or nick. These large flaws, as a general rule, do not contrast as much with the surrounding, well-finished surface as do small pits and nicks. Some of these larger flaws do not have well-defined edges but seem to start gradually and diminish gradually as far as contrast is concerned. Correspondingly, the electrical signal produced by these flaws is less abrupt in its beginning and ending, usually has less amplitude, and lasts for a longer time than the signal produced by a pit or nick.

END GATING

It has been stated previously that the flying spot, starting beyond one end of the part under test, moves across the part under inspection and off the opposite end. This process is called overscanning and is necessary in the system for certain physical reasons. The change in signal strength produced when the spot moves onto the part under test at one end, and off of the part at the opposite end, is greater than the signal produced by any flaw. Any setting of the sensitivity of the photo diode detector PD that will detect a small flaw will also detect the signal produced as the beam scans the ends of the part. A gating system has, therefore, been provided for the machine which causes these detected end signals to be ignored. This is done by only acting on the detector output during the time that the spot is moving on the part, between the ends.

Signals representing the detected flaws, including the crack between parts lined up for testing, are gated by a gate signal such that only signals indicating flows between the gate limits are transmitted further. A first electrical signal is formed when light from the lamp 24 (FIG. 2) is reflected by small mirrors or mirror coatings such as M1 and M2 on the prism PR into a Photo Field Effect Transistor at 26 and electrical signals from the FET are processed by equipment indicated in FIG. 4. This gate signal is present only during the active part of the inspection cycle and during the time when parts are translated to the left (cam switch operated by pusher 8). The latter is necessary to provide a signal for the shifting of the register when there are no parts to feed and thus to maintain proper sequence of the register even though no parts are being fed at the time. At this shift sensing time, of course, no reject signals can be fed to the reject storing input of the shift register.

Additional aspects of the invention will be apparent from FIG. 1 in which the scan pattern of the laser beam in the plane P2 is indicated by the line at 10. Curves representing video signals produced by the photo diode PD are shown superimposed below the respective rollers $f$, $g$, $h$, and $i$. In this figure, (X) marks the edge of the nest position, which is the position "A" of the roller "$f$" which are most recently placed in position on the rollers R. The roller "$g$" is in the current test position "B." The negative pulses J, L and M mark the boundaries between the bearings. Negative pulse L, for example, marks the boundary between the bearing in the test position B of FIG. 1 and the bearing "$h$" immediately to the left of the bearing in position B. The negative pulse M marks the boundary between the bearings in the second and third positions from the test position.

The plateau between the points M and N represents the result of the incomplete scan of the third bearing to the left of (X) and the plateau between N and J represents the left portion of the bearing in the nest position A. The dip at N is caused by the beam shifting from one face of the prism to the other. The number of bearings displayed within one scan will of course vary with the length of the bearings. The pulses J, L and M will be typically about 3 volts with d.c. and a.c. gain pots at the full c.w. positions. The plateau will be at about a 6 volt d.c. level when the d.c. gain pot is in the full c.w. position. There is a clamping diode in the amplifier circuit which should not allow the plateaus to go above the nominally 6 volts d.c. by more than .7 of a volt.

THE ELECTRONIC CIRCUITS

Figure 4:
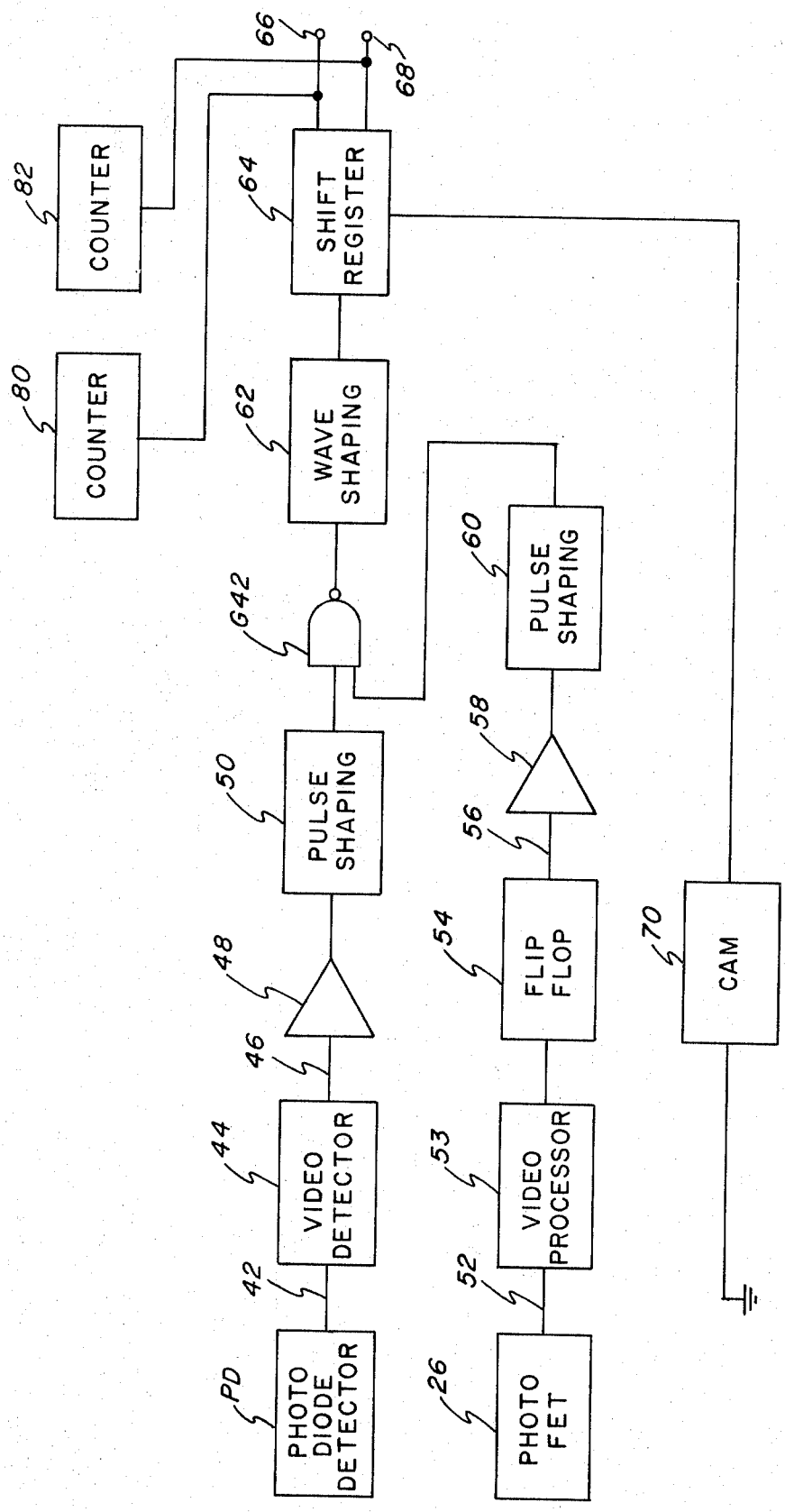
FIG. 4 is a block diagram depicting relationships between photo sensing devices and electrical circuits used in the practice of the invention.

Turn now to FIG. 4 for a description of electronic circuits of use in the practice of this invention.

Figure 5A:
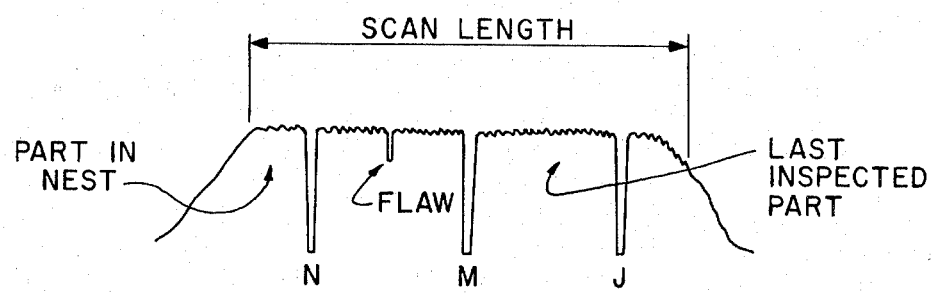
FIGS. 5A, 5B, 6A and 6B represent waveforms of interest in the understanding of the invention.
Figure 5B:
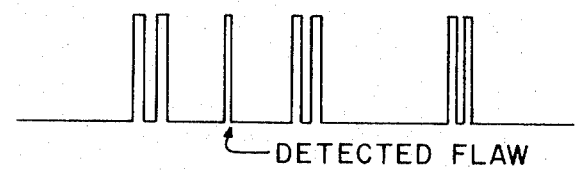

In FIG. 4, blocks representing the Photo Diode Detector PD and the Photo Field Effect Transistor 26 are repeated from FIGS. 2 and 3. As has been indicated previously, the Photo Diode PD responds to reflected light from a test object to provide a video output signal. This signal may be of the form indicated in FIG. 1 and in FIG. 5A. This video signal will appear on a line indicated at 42 in FIG. 4. The video signal is passed through a video detector at 44 to provide a detected video signal, such as is indicated in FIG. 5B. This detected signal is applied over line 46 through suitable amplifier and pulse shaping circuits 48 and 50 as an input to a gate G42. In FIG. 5A, a flaw in a tested roller is indicated as a spike of lesser amplitude than the spikes J, M and N between rollers being tested.

Figure 6A:
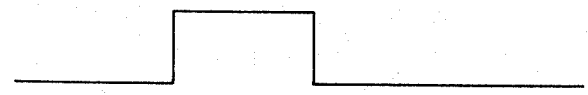

The Photo Field Effect Transistor 26 is responsive to reflections from mirror elements on the face of the rotating prism. This FET produces a pulse each time a mirrored portion of the prism flashes past. In general, two pulses are produced as each one of the six-faces of an exemplary prism PR pass by. The mirror strips are spaced apart at a distance such that they produce pulses having a spacing coincident in time with the time during which the laser beam scans the object under inspection. The pulses are fed over a line 52, where they are processed at 53 to form pulses suitable to operate a bistable circuit, such as a flip-flop, at 54. The bistable 54 produces an output pulse on line 56, which is applied over amplifier and pulse shaping circuits at 58 and 60, to produce a gate circuit substantially as illustrated in FIG. 6A. The gate pulses correspond in length and in timing to the usable portions of the scan periods of the laser beam.

Figure 6B:

The output of gate G 42 depends upon coincidence or lack of coincidence in two events. These are the receipt of a gate pulse from the gate circuit as indicated in FIG. 6A and a pulse representing a "detected flaw" in an object being inspected, as indicated in FIG. 5B. When there is coincidence, the gate G 42 will provide an output such as the detected and gated signal in FIG. 6B. This output will be passed through shaping circuits 62 and the like to a shift register at 64, where the existence of a flaw is recorded for the particular roller under surveillance.

If no flaw is detected while a particular roller is being inspected as indicated for the "last inspected part" in FIG. 5A, there will be no detected video in coincidence with the gate pulse of FIG. 6A. Consequently, the output from the gate G 42 will be of a value indicating no flaw was detected and the memory recorded in the shift register for the roller will indicate that no flaw was discovered.

The shift register is stepped along in a conventional manner by step signals received from timing sources in the machine, such as cam switches indicated by the block at 70. These switches are synchronized with the operation of mechanical elements such as pushers 6 and 8 of the machine so that a memory stage of the shift register is available during the time each roller is being inspected. After a roller is inspected, the register is advanced by the next step signal.

An exemplary shift register may have eight stages. The number of usable stages in the shift register is selected by manual settings in accordance with the number of parts which may be accommodated for inspection. In the example in FIG. 1, memories would be available in the register for rollers "i" and "h" and a memory would be in the process of formation for the roller "g", which is in the inspection position.

Output signals from the shift register may be supplied over terminals such as 66 and 68, where a signal on 66 may indicate a flaw in a given roller while a signal on 68 would indicate no flaw was found in that roller. The signals at 66 and 68 may be used to control conventional sorting equipment which is used to route the given roller to an appropriate bin. The signals at 66 and 68 may also be used to control counters 80 and 86 indicating the number of good and flawed rollers in a given sample of rollers.

While the principles of the invention have been described above in connection with specific apparatus and applications, it is to be understood that this description is made only by way of example and not as a limitation on the scope of the invention.

We claim:

1. An automatic feeding and testing machine for checking for discontinuities in the surface of a test object, comprising
   a source of light collimated as a beam,
   means for deflecting said beam including rotating optical means positioned to intercept said beam,
   said rotating optical means deflecting said beam along a linear path to generate a linear scan pattern focucing as a moving point of light in an image plane,
   mechanical means for moving a plurality of discrete test objects along a path,
   rotating mechanical means for turning a test object about an axis through its center and for maintaining changing portions of the surface of said test object tangent to said image plane,
   the surface of said test object intercepting said moving point of light and producing a reflected beam,
   said reflected beam varying in intensity in accordance with the condition of the surface of said test object, and
   light sensing means positioned to intercept said reflected beam,
   said light sensing means providing an electrical signal proportional to the intensity of said reflected beam.

2. In a machine as claimed in claim 1,
   said optical means including a prism,
   a first lens positioned in said beam for focusing said beam to a point in a plane in said prism,
   said prism transmitting said focused beam in a linear path, and
   a second lens positioned in said linear path to redirect said beam along a linear path of increased length.

3. In a machine as claimed in claim 1,
   said optical means including a multifaceted prism,
   said prism refracting said beam to provide said linear scan.

4. In a machine as claimed in claim 1, means for generating blanking signals including
   a source of light producing a third beam of light,
   reflecting elements attached to said optical means to reflect said third beam and generate a series of discrete reflections,
   photo detector means to detect the discrete reflections and generate electrical outputs proportional thereto, and
   electrical circuits responsive to said electrical outputs to provide said blanking signals.

5. In a machine as claimed in claim 1,
   said optical means including a prism having a plurality of faces,
   a first lens positioned in said beam for focusing said beam in a path through one of said faces to a point in a plane in said prism, said prism transmitting said focused beam in a linear path through a second face, and
a second lens positioned in said linear path to redirect said beam along a linear path of increased length.

6. In a machine as claimed in claim 5, means for generating blanking signals including
a source of light producing a third beam of light, reflecting on the face of said prism to reflect said third beam as a series of discrete reflections,
photo detector means to detect the discrete reflections and generate electrical outputs proportional thereto, and
electrical circuits responsive to said electrical outputs to provide said blanking signals.

7. In a machine as claimed in claim 1, means for generating blanking signals including
a source for an additional beam of light,
reflecting elements on the faces of said rotating element to reflect said additional beam of light as a series of discrete reflections,
photo detector means to detect the discrete reflections and generate electrical outputs proportional thereto, and
electrical circuits responsive to said electrical outputs to provide said blanking signals.

8. In a machine as claimed in claim 1,
means for further collimating said beam including an iris diaphragm and a first lens.

9. In a machine as claimed in claim 8, in which
said optical means is a transparent prism,
said first lens focuses said beam in a plane in said prism, and
a second lens focuses an image from the plane in said prism to a point in another plane to intercept the surface of a test object.

10. In a machine as claimed in claim 4,
gate means responsive to said electrical signal and to said blanking signals to provide output signals having values indicating the presence or absence of flaws.

11. In a machine as claimed in claim 10,
a source of timing signals,
register means responsive to said output signals and to timing signals to provide a record of good and flawed test objects.

12. In a machine as claimed in claim 11,
a plurality of counters,
means coupling said counters to said register means, said register means providing electrical signals indicative of good and flawed test objects, and
said counters establishing a count of the respective number of good and flawed test objects.

13. In a machine as claimed in claim 11,
said register means providing output signals at periodic intervals,
said output signals providing information for use in sorting good and flawed test objects 14. In a machine as claimed in claim 1,
means for moving a plurality of test objects sequentially through a position for scanning by said point of light in said linear scan pattern,
said means for moving test objects including said rotating mechanical means in the form of a plurality of rollers to turn said test objects for scanning, and
a pusher to push said test objects to allow each object to be scanned in succession.

15. In a machine as claimed in claim 14,
said pusher functioning to push each test object in turn off said rollers into a device for sorting said test objects into an acceptable or reject category.

* * * * *

UNITED STATES PATENT OFFICE
CERTIFICATE OF CORRECTION

Patent No. 3,799,682　　　　　　　　　Dated March 26, 1974

Inventor(s) Harry Elliott Colestock et al.

It is certified that error appears in the above-identified patent and that said Letters Patent are hereby corrected as shown below:

Claim 1, line 18, "focucing" should read -- focusing --.

Claim 2, line 39, claim 3, line 48, claim 4, line 54, claim 5, line 63 and claim 9, line 31, "optical means", each occurrence, should read -- rotating optical means --.

Signed and sealed this 17th day of September 1974.

(SEAL)
Attest:

McCOY M. GIBSON JR.　　　　　　　　C. MARSHALL DANN
Attesting Officer　　　　　　　　　　Commissioner of Patents